(No Model.)
J. STEELE.
VEHICLE SEAT.
No. 351,943. Patented Nov. 2, 1886.
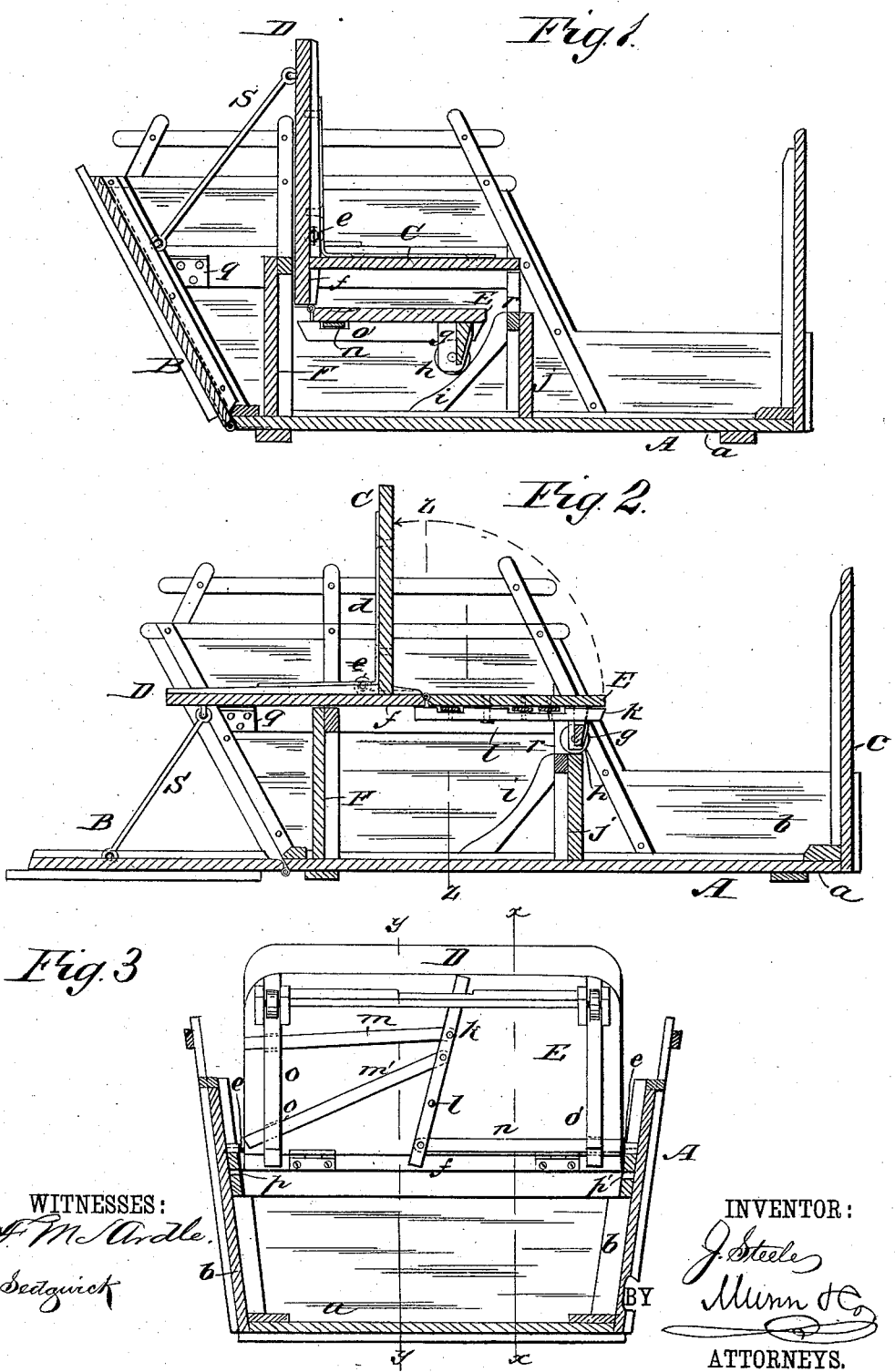
WITNESSES:
F. McArdle
C. Sedgwick
INVENTOR:
J. Steele
BY Munn & Co
ATTORNEYS.

UNITED STATES PATENT OFFICE.

JAMES STEELE, OF GUELPH, ONTARIO, CANADA.

VEHICLE-SEAT.

SPECIFICATION forming part of Letters Patent No. 351,943, dated November 2, 1886.

Application filed September 9, 1886. Serial No. 213,102. (No model.)

*To all whom it may concern:*

Be it known that I, JAMES STEELE, of Guelph, in the Province of Ontario, Dominion of Canada, have invented a new and Improved Vehicle-Seat, of which the following is a specification, reference being had to the annexed drawings, forming a part thereof, in which—

Figure 1 is a longitudinal section, taken on line $x\,x$ of Fig. 3, of a vehicle-body embodying my invention, showing the seat closed. Fig. 2 is a longitudinal section of the same, taken on line $y\,y$ in Fig. 3, showing the seat unfolded; and Fig. 3 is a vertical transverse section taken on line $z\,z$ in Fig. 2, with the auxiliary seat raised, showing its inner surface.

Similar letters of reference indicate corresponding parts in all the views.

The object of my invention is to construct a vehicle body and seat which may be arranged as a single or double seated vehicle.

My invention consists in a vehicle-body provided with a hinged back and a tilting seat connected with the hinged back by rods jointed to the seat and to the back of the body, and an auxiliary seat hinged to an extension of the back of the main seat and provided with rollers made to ride upon guides arranged in the vehicle-body below the main seat, all as hereinafter more fully described.

The vehicle-body A is formed with the usual floor, $a$, the side pieces, $b$, and dash-board $c$, and is furnished with an end-board, B, that is hinged to the bottom board, and is capable of closing against the inclined ends of the side pieces, or of being let down into horizontal position, as may be required.

The main seat C is secured to the back D, and stayed by angled irons $d$. To the back are secured trunnions $e$, which turn in bearings supported by the sides of the body A. The trunnions $e$ are located a short distance above the main seat C, and the part $f$ of the back D extends below the seat C. To the said part $f$ of the back D is hinged the auxiliary seat E, the combined width of the said auxiliary seat and the part $f$ of the back D being about equal to the width of the seat C.

In standards $g$, projecting downward from the bottom of the auxiliary seat E, are journaled the rollers $h$, and in the body A, in opposite sides thereof, are secured inclined concaved guides $i$, which lead to the top of the transverse board $j$, forming the support of the auxiliary seat when the seat is unfolded, as shown in Fig. 2. To the under surface of the auxiliary seat E is pivoted a lever, $k$, on the screw $l$, and to the lever $k$ are pivoted the bolts $m\;m'$, which extend through guides $o$, and are capable of being projected into mortises $p$ in the side of the body A. To the opposite extremity of the lever $k$ is pivoted a bolt, $n$, which projects through a guide, $o'$, upon the opposite end of the seat, and is capable of entering a mortise, $p'$, in the opposite side of the body A. A board, F, extends across the body A at the rear of the seat, and at a suitable height brackets $q$ are secured to the side pieces of the body, near their rear ends, for supporting the back D when turned down into a horizontal position. When only a single seat is desired, the back D is raised into a vertical position, bringing the main seat C into a horizontal position, where it is supported by the timbers $r$ of the frame of the vehicle. The auxiliary seat E is folded under the main seat C, as shown in Fig. 1, and at the same time the back D is brought into contact with the rear ends of the side pieces of the body A. When two seats are required, the back D is lowered into a horizontal position by turning it on its pivots, thus lowering the end-board B, and bringing it into a horizontal position by means of the rods $s$, jointed to the end-board and to the seat-board. This operation brings the main seat C into a vertical position, so that it will answer as a back to both seats. At the same time the auxiliary seat E is carried upward by the engagement of the rollers $h$ with the guides $i$, so that when brought into the position of use the rollers $h$ will rest upon the upper edge of the board $j$. The bolts $m$, $m'$, and $n$ are then projected, holding the auxiliary seat E in the position of use.

Having thus fully described my invention, I claim as new and desire to secure by Letters Patent—

1. The combination, with a pivoted seat-back and seat rigidly secured thereto, of an end-board hinged to the vehicle-body and rods connecting the seat-back and the hinged end-board to cause them to move together, substantially as described.

2. The combination, with the pivoted seat formed of a seat, C, and seat-back D, of an auxiliary seat, E, hinged to an extension of the seat-back D, and means for guiding and supporting the auxiliary seat, substantially as described.

3. The combination, with the pivoted vehicle-seat formed of the seat C and seat-back D, rigidly secured together, of the hinged end-board B, rods $s$, connecting the end-board and the seat-back, the auxiliary seat E, provided with the rollers $h$, and hinged to an extension of the seat-back D, the curved inclined guides $i$, and the board $j$, substantially as described.

JAMES STEELE.

Witnesses:
JOHN MITCHELL,
ARCHD. M. MCKINNON.